US007655108B2

(12) United States Patent
Nakanishi

(10) Patent No.: US 7,655,108 B2
(45) Date of Patent: Feb. 2, 2010

(54) DISPLAY PANEL ASSEMBLY APPARATUS AND ASSEMBLY METHOD

(75) Inventor: Tomoaki Nakanishi, Saga (JP)

(73) Assignee: Panasonic Corporation, Osaka (JP)

( * ) Notice: Subject to any disclaimer, the term of this patent is extended or adjusted under 35 U.S.C. 154(b) by 739 days.

(21) Appl. No.: 11/216,116

(22) Filed: Sep. 1, 2005

(65) Prior Publication Data

US 2006/0068677 A1 Mar. 30, 2006

(30) Foreign Application Priority Data

Sep. 27, 2004 (JP) .............................. 2004-279080

(51) Int. Cl.
*B32B 37/00* (2006.01)

(52) U.S. Cl. .......................... 156/297; 156/299; 29/563; 29/740

(58) Field of Classification Search .................... 29/740, 29/563; 156/297, 556, 299
See application file for complete search history.

(56) References Cited

U.S. PATENT DOCUMENTS

2003/0070280 A1 * 4/2003 Katano et al. ................. 29/563

FOREIGN PATENT DOCUMENTS

| | | | |
|---|---|---|---|
| JP | 8-330747 | | 12/1996 |
| JP | 09-043622 | | 2/1997 |
| JP | 10-163276 | | 6/1998 |
| JP | 3246282 | | 11/2001 |
| JP | 2001-358177 | A | 12/2001 |
| JP | 3275744 | | 2/2002 |
| JP | 2002116706 | A * | 4/2002 |
| JP | 3531586 | | 3/2004 |

OTHER PUBLICATIONS

South Korea Office Action, mailed Feb. 24, 2009.

* cited by examiner

*Primary Examiner*—John L Goff
(74) *Attorney, Agent, or Firm*—McDermott Will & Emery LLP

(57) ABSTRACT

Display panel assembly apparatus for assembling a display panel by bonding a driver substrate onto a glass panel via a connector and bonding material. A panel positioning table retains the glass panel in which the connector is bonded to its edge, and positions the glass panel with respect to a bonder from one side. The substrate to which a bonding tape is applied by a bonding tape applicator is transferred to the bonder from the other side by circulating a substrate holder on which the substrate is placed using a circulatory transport mechanism. The connector prebonded on the glass panel and the substrate are then bonded via the bonding tape. Adoption of this configuration for the display panel assembly apparatus and assembly method reduces the apparatus installation area while achieving high productivity.

3 Claims, 13 Drawing Sheets

DISPLAY PANEL ASSEMBLY APPARATUS AND ASSEMBLY METHOD

BACKGROUND OF THE INVENTION

1. Field of the Invention

The present invention relates to display panel assembly apparatus and an assembly method for assembling display panels by bonding a glass panel and driver substrate via a connector.

2. Background Art

Display panels, including plasma display panels and liquid crystal display panels employed in displays of electronic apparatuses, are assembled by bonding a driver substrate onto the edge of a glass panel, which becomes the display screen, via a connector such as TCP (tape carrier package). In this assembly type, the glass panel, connector, and terminals formed on the edge of the driver substrate are bonded using a bonding material such as an anisotropic conductive tape. This technology is disclosed in the Japanese Patent No. 3531586. Conventional thermo-compression bonding apparatus bonds a connector, bonded in advance on the driver substrate, onto the edge of glass panel by thermo-compression to assemble a display panel.

In line with the recent diversification of display panels, manufacturing processes are also becoming more diverse depending on panel size and type. For example, a glass panel with connector bonded in advance is needed for using a glass panel with narrow-pitch terminals to permit higher-density mounting. To use this type of glass panel, an anisotropic conductive tape needs to be attached to the driver substrate. This makes conventional thermo-compression bonding apparatus not applicable on its own, since it requires an additional unit for attaching the anisotropic conductive tape. However, attachment of this additional unit increases the area occupied by the assembly apparatus, and in some cases results in loss of operational efficiency.

SUMMARY OF THE INVENTION

The present invention aims to offer display panel assembly apparatus and an assembly method that reduce the apparatus installation area while achieving high productivity.

The display panel assembly apparatus of the present invention assembles a display panel by bonding the substrate onto a glass panel via a connector and bonding material. The assembly apparatus includes a bonder for bonding the connector attached to the glass panel in advance and the substrate using the bonding material; a panel-positioning unit disposed on one side (a first side) of the bonder for holding the glass panel in which the connector is bonded to its edge and positioning the glass panel with respect to the bonder; a panel transport unit for loading the glass panel onto the panel-positioning unit and unloading an assembled display panel from the panel-positioning unit; a substrate transport unit disposed on the other side (a second side) of the bonder for circulating a substrate holder holding the substrate by a circulatory transport mechanism so as to transport the substrate supplied to the substrate holder by a substrate feeder at a substrate-feeding position to the bonder; and a bonding material feeder disposed on the circulating route of the circulatory transport mechanism for supplying the bonding material to the substrate held by the substrate holder.

The display panel assembly method of the present invention assembles the display panel by bonding the glass panel onto the substrate with the bonding material by the bonder. The assembly method of the present invention includes a panel-loading step for loading the glass panel of which the connector is bonded to its edge onto the panel-positioning unit; a panel-positioning step for holding the glass panel on the panel-positioning unit and positioning the glass panel from one side (a first side) of the bonder; a substrate transport step for transferring the substrate supplied to the substrate holder at the substrate-feeding position from the other side (a second side) of the bonder by circulating the substrate holder onto which the substrate is placed using a circulatory transport mechanism; a bonding material feeding step for supplying the bonding material to the substrate held with the substrate holder by the bonding material feeder disposed on the circulating route of the circulatory transport mechanism in the middle of the substrate transport step; a bonding step for bonding the connector bonded to the glass panel in advance and the substrate using the bonding material by the bonder; and a panel-unloading step for unloading the assembled display panel from the panel-positioning unit.

DETAILED DESCRIPTION OF THE INVENTION

PREFERRED EMBODIMENT

A preferred embodiment of the present invention is described below with reference to drawings.

Figure 1:
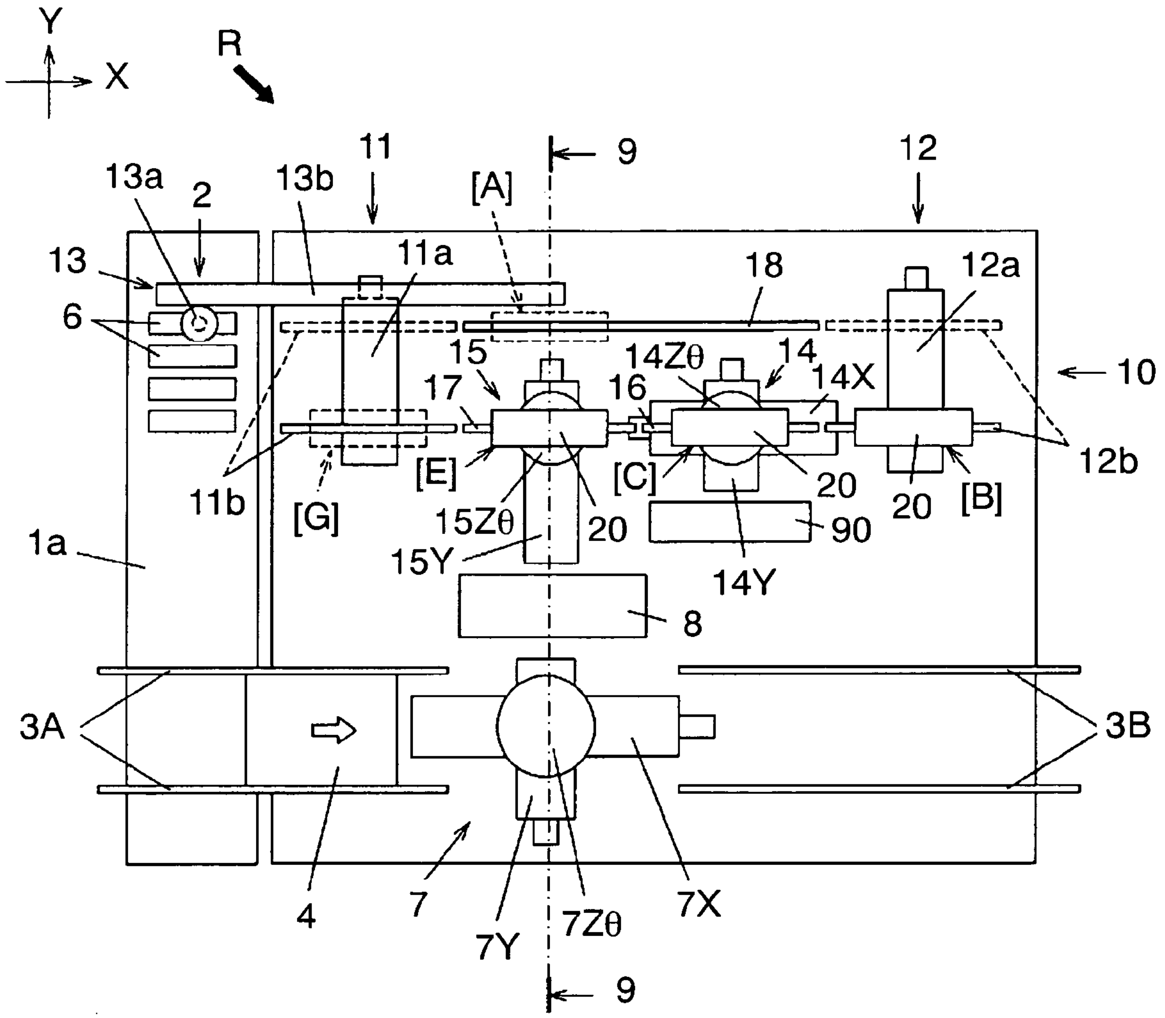
FIG. 1 is a plan view of display panel assembly apparatus in accordance with a preferred embodiment of the present invention.
Figure 2:
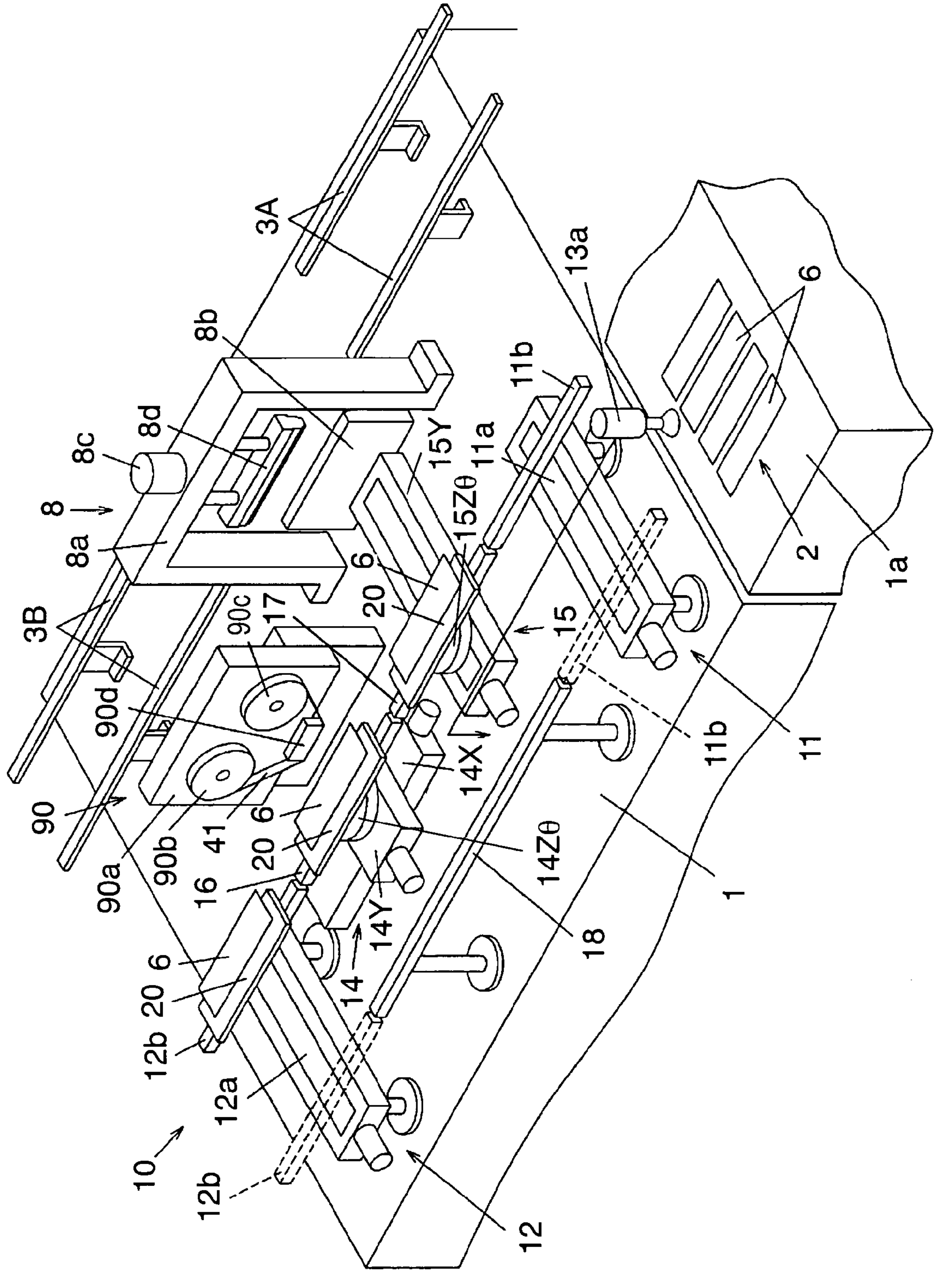
FIG. 2 is a perspective view of the display panel assembly apparatus in accordance with the preferred embodiment of the present invention.

FIG. 1 is a plan view of display panel assembly apparatus in the preferred embodiment of the present invention. FIG. 2 is a perspective view of the display panel assembly apparatus in the preferred embodiment of the present invention. A structure of the display panel assembly apparatus is described below with reference to FIGS. 1 and 2.

The display panel assembly apparatus has the function of assembling a display panel by bonding a driver substrate (first workpiece) onto a glass panel via a connector and an adhesive tape made of anisotropic conductive agent (bonding material). The connector is already connected to the glass panel in the previous step, and this glass panel, when connected to the connector, configures the second workpiece. The display panel assembly apparatus of the present invention is thus the workpiece assembly apparatus for bonding and assembling the first and second workpieces. FIG. 2 is a perspective view of FIG. 1 seen from the direction of arrow R.

In FIGS. 1 and 2, sub-base la is attached next to base 1 in direction X. Substrate feeder 2 which stocks and supplies substrate 6, the first workpiece, is disposed on the top face of sub-base 1*a*. Loading conveyor 3A and unloading conveyor 3B are provided in series along direction X in front (bottom in FIG. 1 and upper right in FIG. 2) of sub-base 1*a* and base 1. Panel-positioning table 7 is disposed between loading conveyor 3A and unloading conveyor 3B. Loading conveyor 3A transfers glass panel 4, the second workpiece, supplied from the upstream (left in FIG. 1 and right in FIG. 2) to panel-positioning table 7.

Panel-positioning table 7 is configured by piling X-axis table 7X, Y-axis table 7Y, and Zθ-axis table 7Zθ, and holds glass panel 4 loaded from loading conveyor 3A. Bonder 8, described later, is disposed at the back of loading conveyor 3A and unloading conveyor 3B on base 1. Panel-positioning table 7 positions glass panel 4 against bonder 8.

In this position, substrate 6 transferred by circulatory transport mechanism 10, described later, and glass panel 4 are bonded to assemble a display panel. The assembled display panel, which is glass panel 4 to which substrate 6 is bonded through the connector, is unloaded to downstream apparatus by unloading conveyor 3B. Loading conveyor 3A and unloading conveyor 3B comprise a panel transport unit that loads glass panel 4 to panel-positioning table 7 and unloads glass panel 4 from panel-positioning table 7.

Figure 3:
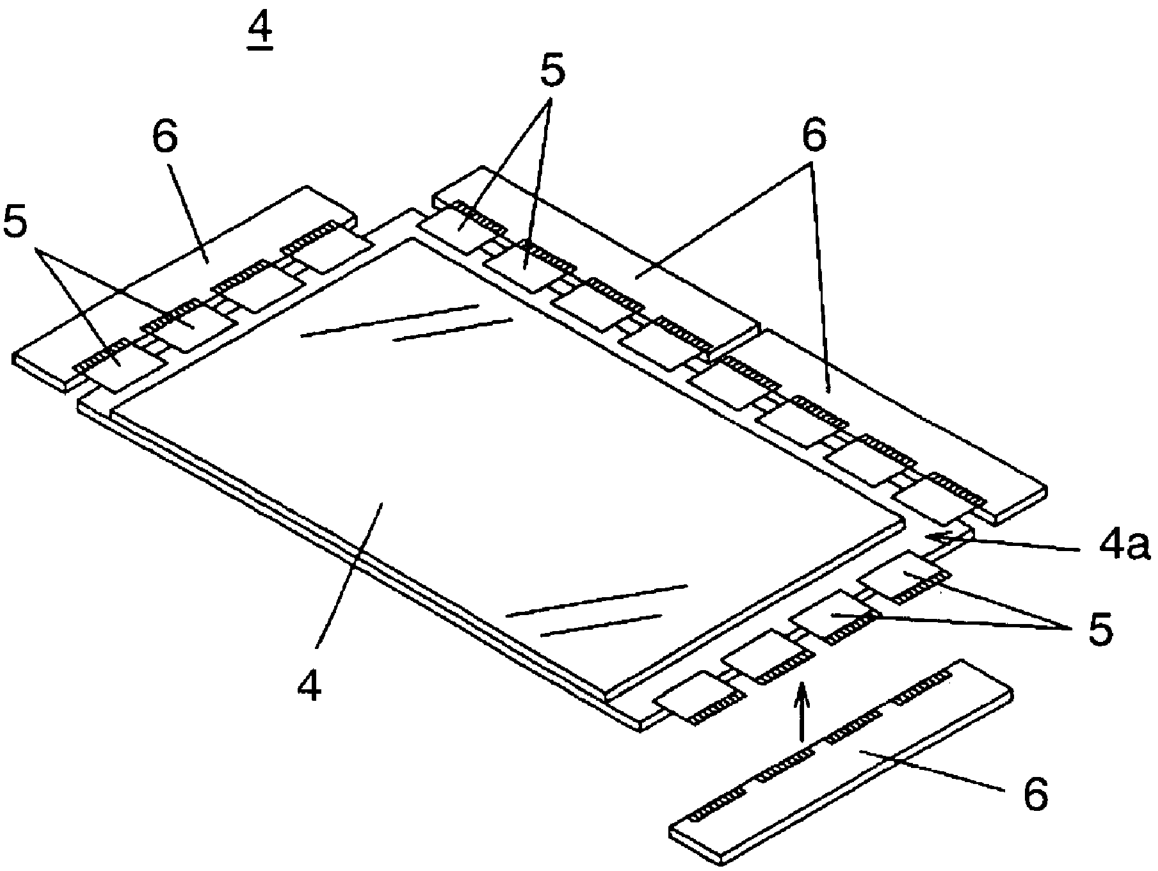
FIG. 3 is a perspective view of a display panel to be assembled in the display panel assembly apparatus in accordance with the preferred embodiment of the present invention.

FIG. 3 is a perspective view of the display panel to be assembled in the display panel assembly apparatus in the preferred embodiment of the present invention. Components configuring the display panel and the operation of display panel assembly are described next with reference to FIG. 3.

As shown in FIG. 3, glass panel 4 is used for display devices such as a liquid crystal display, and is configured with two laminated rectangular glass sheets. Connectors 5 have been bonded in a previous step on edge 4*a* of one of the glass sheets exposed in the outer edge of glass panel 4. In this display panel assembly operation, connector terminals provided respectively on connectors 5 and substrate 6 are bonded using bonding tape (refer to FIGS. 9A and 9B described later.).

As shown in FIG. 1, circulatory transport mechanism 10 is disposed at the back (top in FIG. 1 and lower left in FIG. 2) of bonder 8 on the top face of base 1. Circulatory transport mechanism 10 transfers multiple substrate holders 20 holding substrate 6 along a predetermined circulating route configured by combining linear guide rails so as to transfer substrate 6 taken out from substrate feeder 2 by substrate-feeding mechanism 13 to bonder 8 via bonding tape applicator 90. The use of this structure enables efficient transfer of thin and easily-warped substrate 6 using a small number of substrate holders 20.

The display panel assembly apparatus as configured above has a layout providing a mechanism for transferring and positioning glass panel 4 including loading conveyor 3A, unloading conveyor 3B, and panel-positioning table 7 on one side of bonder 8; and a substrate transport system for transferring substrate 6 supplied from substrate feeder 2 and held by substrate holder 20 to bonder 8 by circulatory transport mechanism 10 on the other side of bonder 8.

Substrate-feeding mechanism 13 is equipped with substrate holding head 13*a* for holding substrate 6 by suction. Head transfer table 13*b* transfers substrate holding head 13*a* holding substrate 6 to substrate-feeding position [A] (workpiece feeding position) set on the circulating route of circulatory transport mechanism 10. Substrate 6 is then placed on and held by substrate holder 20 in this position. Since substrate 6 is difficult to handle and transfer because it is a flexible resin substrate which is thin and easily warped, substrate holder 20 supports and clamps the rear face of substrate 6 for transfer and positioning. Substrate-feeding mechanism 13 is a substrate-feeding unit (first workpiece feeder) that supplies substrate 6 to substrate holder 20 at substrate-feeding position [A].

The circulating route of circulatory transport mechanism 10 is configured with five guide rails: movable rails 16 and 17, fixed rail 18, and movable rails 11*b* and 12*b* disposed respectively along direction X. Of these guide rails, fixed rail 18 is fixed onto base 1, and the other four guide rails are movable by their respective rail transfer mechanisms.

More specifically, movable rails 11*b* and 12*b* respectively move in direction Y by means of rail transfer table 11*a* and rail transfer table 12*a* of first rail transfer unit 11 and second rail transfer unit 12. Movable rail 16 moves in directions X, Y, Z, and θ by means of X-axis table 14X, Y-axis table 14Y, and Zθ-axis table 14Zθ of first holder transfer table 14. Still more, movable rail 17 moves in directions X, Y, Z, and θ by means of X-axis table 15X, Y-axis table 15Y, and Zθ-axis table 15Zθ of second holder transfer table 15.

Figure 4:
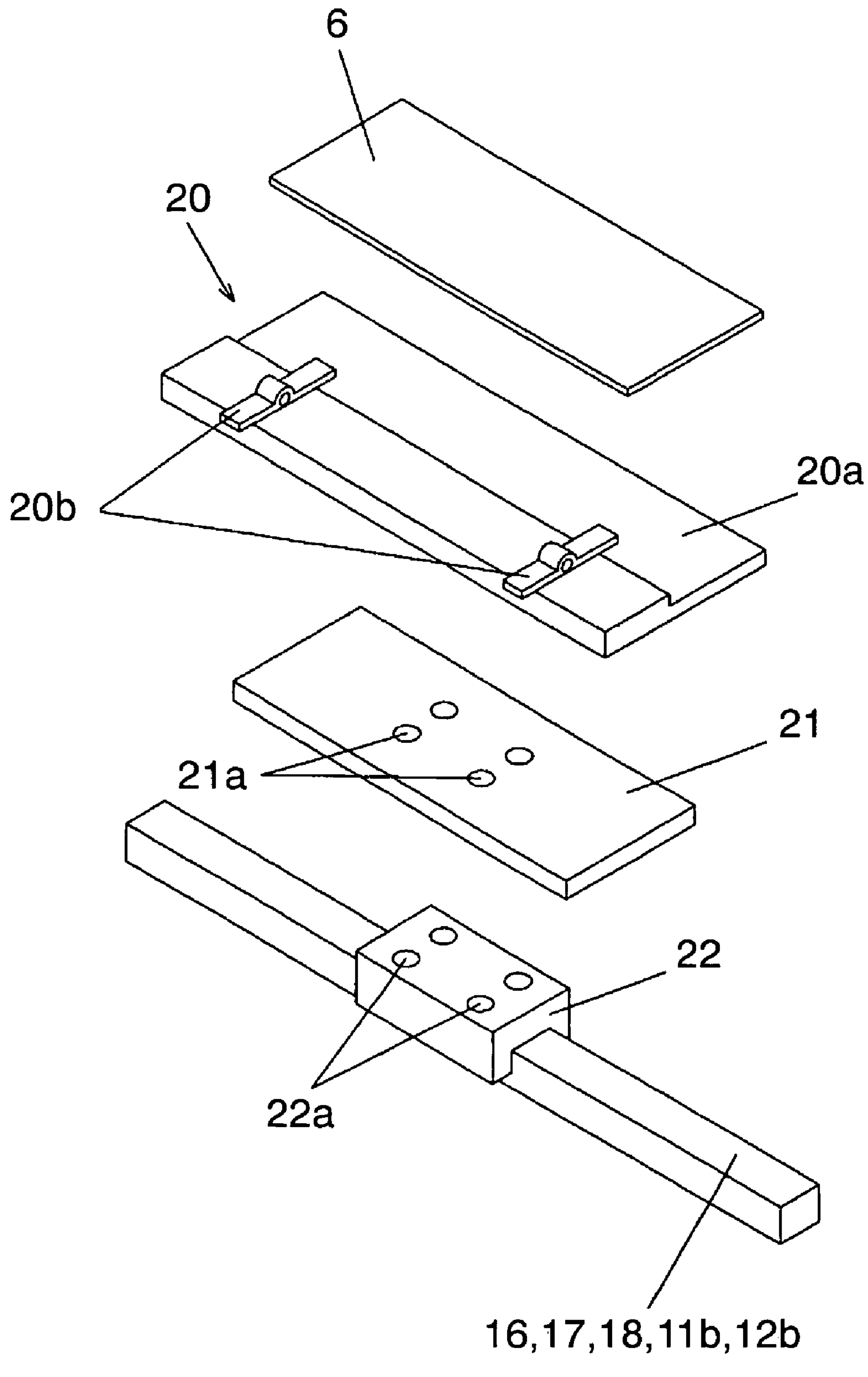
FIG. 4 is an exploded perspective view of a linear guide member and substrate holder of the display panel assembly apparatus in accordance with the preferred embodiment of the present invention.

FIG. 4 is an exploded perspective view of the linear guide member and substrate holder of the display panel assembly apparatus in the preferred embodiment of the present invention. Substrate holder 20 (workpiece holder) is described next with reference to FIG. 4.

Substrate holder 20 is a flat plate that includes substrate placement area 20*a* which contacts and retains the bottom face of substrate 6, and damper 20*b* which holds down and secures substrate 6. Substrate holder 20 is fixed to slider 22 through attachment table 21. Accordingly, substrate holder 20 can slide along movable rail 16, for example. In substrate holder 20, damper 20*b* is not essential. A method of securing substrate 6 by suction is also applicable.

Attachment table 21 is attached to slider 22 with a bolt on attachment hole 21*a* and screw hole 22*a*. Substrate holder 20 can be transferred between guide rails when two guide rails are aligned lengthwise and the end faces of these guide rails in the length direction are brought closer to a predetermined distance.

Figure 5A:
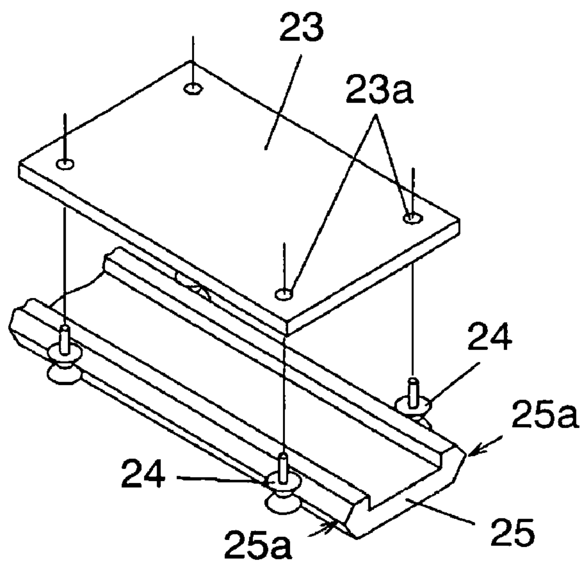
FIGS. 5A, 5B, and 5C are perspective views of the linear guide member of the display panel assembly apparatus in accordance with the preferred embodiment of the present invention.
Figure 5B:
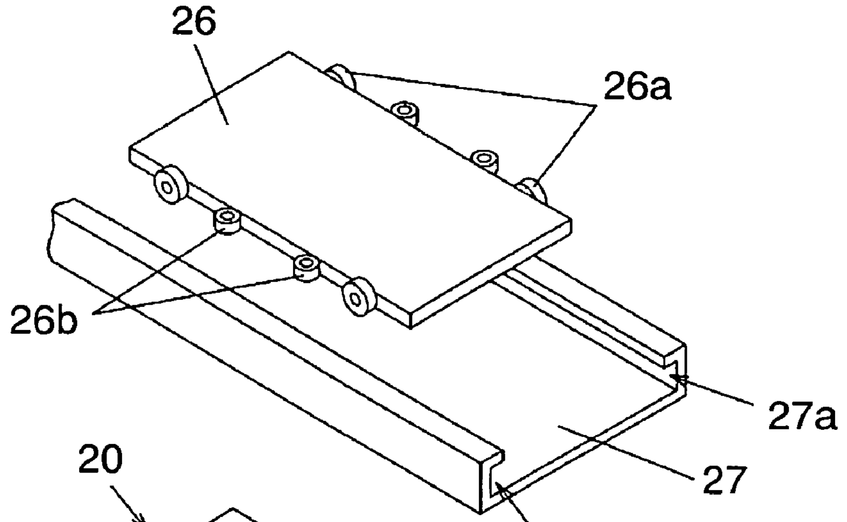
Figure 5C:
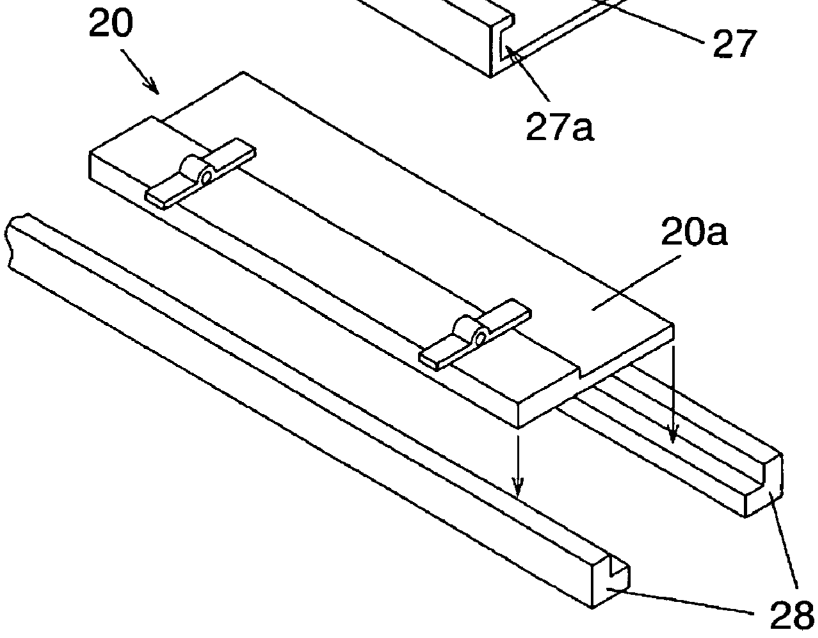

FIGS. 5A, 5B, and 5C are perspective views of the linear guide member in the display panel assembly apparatus in the preferred embodiment of the present invention. In this preferred embodiment, a linear guide rail is used as the linear guide member for guiding the transfer of substrate holder 20. However, other forms of linear guide member shown in FIGS. 5A, 5B, and 5C are also applicable. The example shown in FIG. 5A uses V-guide rail 25, to which V-edge 25*a* is provided at both ends, as the linear guide member. Attachment table 23 in which V-guide roller 24 is inserted to attachment hole 23*a* is employed instead of attachment table 21 and slider 22. Substrate holder 20 fixed to attachment table 23 moves along V-guide rail 25 by the movement of V-guide roller 24 along V-edge 25*a* of V-guide rail 25.

An example shown in FIG. 5B uses guide frame 27, to which guide groove 27*a* is provided at both ends, as the linear guide member. Attachment table 26 to which vertical guide wheel 26*a* and horizontal guide wheel 26*b* are attached is employed instead of attachment table 21 and slider 22. In this example, substrate holder 20 fixed to attachment table 26 moves by rotating vertical guide wheel 26*a* and horizontal guide wheel 26*b* in guide groove 27*a*. Still more, FIG. 5C is an example where substrate holder 20 itself acts as the linear guide member. Substrate holder 20 is directly placed on sliding rail 28, along which it slides, as the linear guide member.

Substrate holder 20 transferred to movable rail 16 on the circulating route by circulatory transport mechanism 10 moves together with movable rail 16 by driving first holder transfer table 14. Accordingly, substrate 6 held by substrate holder 20 relatively moves with respect to bonding tape applicator 90. Through this relative movement, bonding tape applicator 90 applies bonding tape 41 onto substrate 6.

As shown in FIG. 2, bonding tape applicator 90 is configured with feeding reel 90*b*, collecting reel 90*c* and applying tool 90*d* on the front face of vertical frame 90*a*. Bonding tape 41 fed from feeding reel 90*b* is pressed onto substrate 6 by applying tool 90*d*, and thus bonding tape 41 is attached to the edge of substrate 6.

Substrate holder 20 holding substrate 6 after bonding tape 41 is applied is transferred to movable rail 17. Here, substrate holder 20 holding substrate 6 is positioned with respect to bonder 8 by driving second holder transfer table 15. As shown in FIG. 2, bonder 8 includes gate frame 8*a* and back support 8*b*. Pressing tool 8*d*, which is vertically driven by frame 8a, is provided on frame 8*a*. Substrate 6 held by substrate holder 20 is placed on back support 8*b*, and is relatively positioned with respect to glass panel 4 positioned by aforementioned panel-positioning table 7. Connectors 5 attached to glass panel 4 in advance are bonded onto substrate 6 with bonding tape 41 by lowering pressing tool 8*d*.

Figure 6:
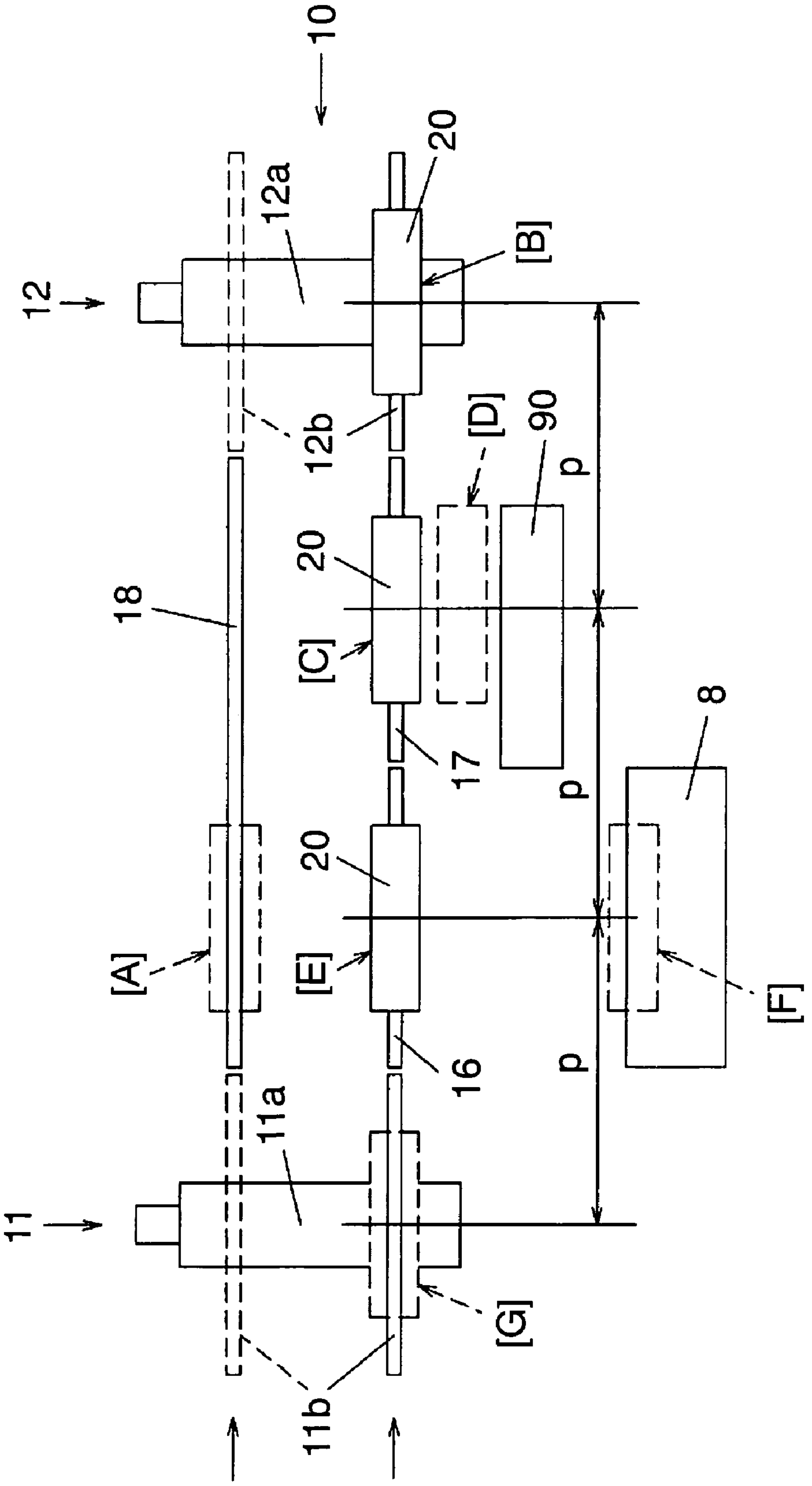
FIG. 6 is a layout of a substrate transport system of the display panel assembly apparatus in accordance with a preferred embodiment of the present invention.
Figure 7:
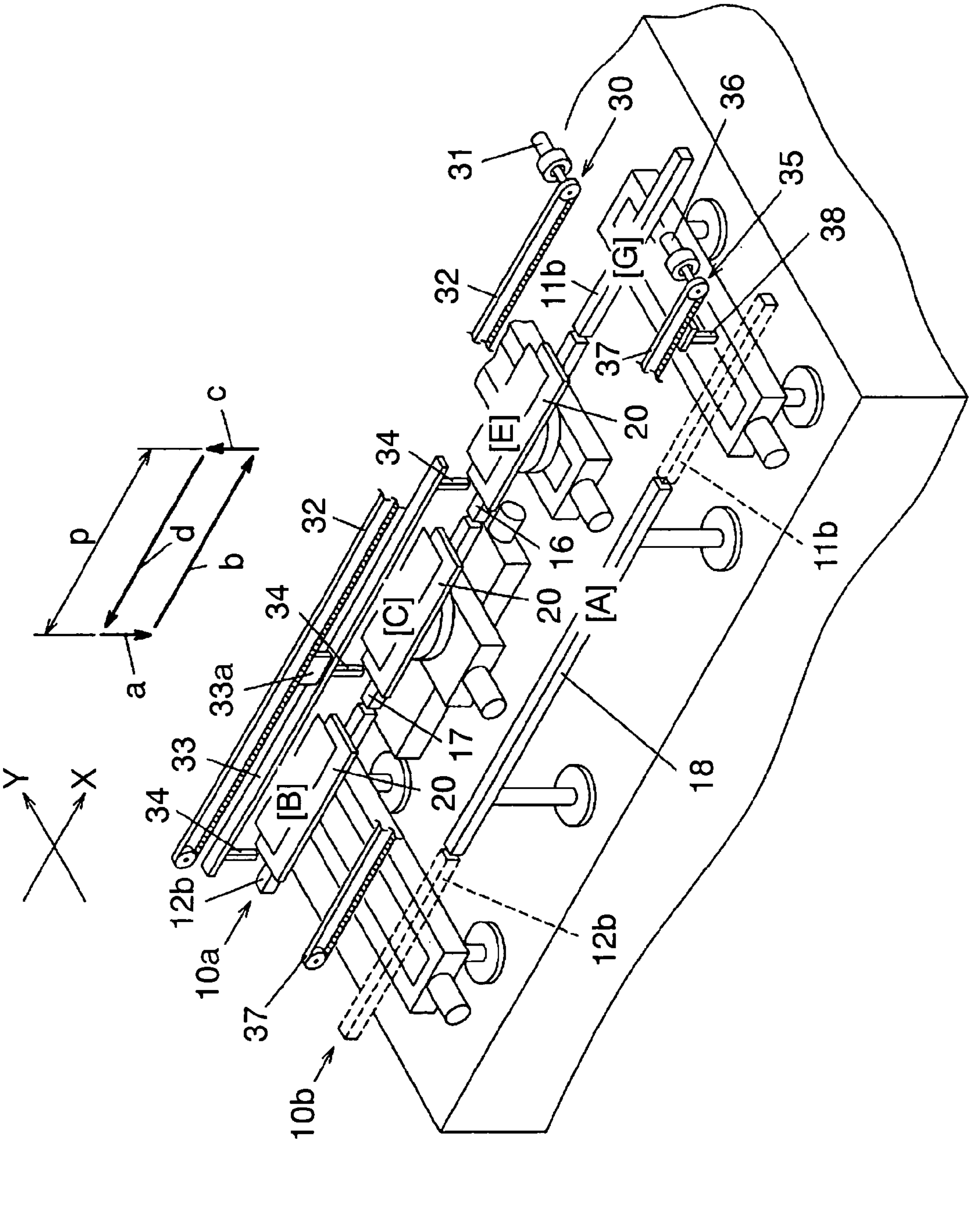
FIG. 7 is a fragmentary perspective view of the display panel assembly apparatus in accordance with the preferred embodiment of the present invention.

FIG. 6 shows a layout of the substrate transport system of the display panel assembly apparatus in the preferred embodiment of the present invention. FIG. 7 is a fragmentary perspective view of the display panel assembly apparatus in the preferred embodiment of the present invention. The functions of circulatory transport mechanism 10 and each position set in the circulating route of circulatory transport mechanism 10 are described next with reference to FIGS. 6 and 7.

In FIG. 6, movable rails 11*b* and 12*b* are aligned on the same line as movable rails 16 and 17 by driving rail transfer tables 11*a* and 12*a* of first rail transfer unit 11 and second rail transfer unit 12. Movable rails 11*b*, 16, 17, and 12*b* thus form first linear transport route 10*a*. Movable rails 11*b* and 12*bc* can also be moved and aligned in the same way on the same line as fixed rail 18 by driving rail transfer tables 11*a* and 12*a* so as to form second linear transport route 10*b*.

First transport route 10*a* and second transport route 10*b* are parallel to panel loading conveyor 3A and panel unloading conveyor 3B, and are disposed across bonder 8. First transport route 10*a* is nearer to bonder 8 than second transport route 10*b*. In other words, second transport route 10*b* is disposed parallel to first transport route 10*a* at a position slightly more distant from bonder 8 than first transport route 10*a* on the face at the same side of bonder 8.

This circulating route is configured in a way that movable rails 11*b* and 12*b* are movable between both ends of first transport route 10*a* and between both ends of second transport route 10*b*. This configuration enables multiple substrate holders 20 to move in circulating fashion along the circulating route including first transport route 10*a* and second transport route 10*b*. More specifically, substrate holder 20 transfers between guide rails and moves linearly along first transport route 10*a* and second transport route 10*b*. Substrate holder 20 transfers between first transport route 10*a* and second transport route 10*b* parallel to each other by driving rail transfer tables 11*a* and 12*a* to slide movable rails 11*b* and 12*b* in direction Y when substrate holder 20 is transferred to movable rails 11*b* and 12*b*. This configuration of the circulating route for circulating substrate holder 20 achieves a compact and simple circulatory transport mechanism.

The position where substrate holder 20 transfers from movable rail 11*b* to fixed rail 18 in second transport route 10*b* is indicated as substrate-feeding position [A] as described previously. Substrate-feeding mechanism 13 supplies substrate 6 to substrate holder 20 when substrate holder 20 reaches this substrate-feeding position [A]. Substrate holder 20 holding substrate 6 then moves toward the downstream of second transport route 10*b*, and is transferred to movable rail 12*b*. The position where this substrate holder 20 reaches the right end of first transport route 10*a* by second rail transfer unit 12 is loading standby position [B] where substrate holder 20 stands by until the timing where substrate holder 20 can be loaded to the operation standby position described below.

The substrate-feeding position is not limited to that illustrated in the drawing. The substrate-feeding position can be at any position where substrate 6 is not present on substrate holder 20. For example, unloading position [G], described later, can also be used as the substrate-feeding position. It is apparent that the substrate-feeding position can be set to any other point as long as it is on the circulating route of circulatory transport mechanism 10.

In FIG. 6, first operation position [D] provided adjacent to bonding tape applicator 90 is an operation position to which substrate holder 20 is transferred to apply bonding tape 41 onto substrate 6 by bonding tape applicator 90. First operation standby position [C] is set on movable rail 17. This is the position where substrate holder 20, loaded via loading standby position [B] after substrate 6 is supplied at substrate-feeding position [A], stops and stands by before moving onto first operation position [D].

Also in FIG. 6, second operation position [F] provided adjacent to bonder 8 is the position where substrate holder 20 is transferred for bonding substrate 6 onto glass panel 4 by bonder 8. Second operation standby position [E] is provided on movable rail 16, and this is where substrate holder 20 holding substrate 6 after bonding tape 41 is applied stops and stands by before moving onto second operation position [E].

Loading standby position [B], first operation standby position [C], second operation standby position [E], and unloading position [G] are set on first transport route 10*a* at predetermined pitch p. This enables synchronized transport at an equivalent pitch by first holder transport mechanism 30 described later. A position on movable rail 11*b* where substrate holder 20 is transferred from movable rail 16 is unloading position [G] where substrate holder 20 is unloaded from first transport route 10*a*.

FIG. 7 illustrates a holder transport mechanism which transfers substrate holder 20 along first transport route 10*a* and second transport route 10*b*. In FIG. 7, first holder transport mechanism 30 and second holder transport mechanism 35 are respectively disposed over first transport route 10*a* and second transport route 10*b*. First holder transport mechanism 30 simultaneously transports three substrate holders 20 by means of three transport hooks 34 connected to connecting member 33. Connecting member 33 is coupled to belt 32 via coupling member 33*a*. Belt 32 horizontally reciprocates in direction X, driven by motor 31, and transport hooks 34 are synchronously movable vertically by an elevating mechanism (not illustrated).

While three transport hooks 34 are individually positioned at an end face of substrate holder 20 in direction X at loading standby position [B], first operation standby position [C], and second operation standby position [E]; transport hooks 34 are lowered to the pushing level (arrow a); and then belt 32 is moved to the direction of arrow b by driving motor 31 so that each substrate holder 2 can be simultaneously moved along first transport route 10*a*.

Here, if the movement of transport hooks 34 by belt 32 is set to aforementioned pitch p, substrate holders 20 respectively at loading standby position [B], first operation standby position [C], and second operation standby position [E] are moved on first transport route 10*a* to first operation standby position [C], second operation standby position [E], and unloading position [G]. Then, in this state, transport hooks 34 are elevated to the backward level (arrow c), and then belt 32 is moved to the direction indicated by arrow d such that each of the transport hooks 34 returns to its origin in readiness for the next holder movement.

Second holder transport mechanism 35 is configured with one transport hook 38 coupled to belt 37 which horizontally reciprocates in direction X, driven by motor 36. Transport hook 38 is positioned to substrate holder 20 on second transport route 10*b*. Transport hook 38 is then lowered to the pushing level, and belt 37 is moved to the direction indicated by arrow d so that substrate holder 20 moves along second transport route 10*b*.

Accordingly, substrate holder 20 on movable rail 11*b* coupled to second transport route 10*b* is moved to substrate-feeding position [A] on fixed rail 18, after which substrate holder 20 is further moved along fixed rail 18 so as to be transferred to movable rail 12*b*. This substrate holder 20 then moves to loading standby position [B] together with movable rail 12*b* by second rail transfer unit 12. This completes one cycle of circulatory movement of substrate holder 20 by circulatory transport mechanism 10.

The circulating route of circulatory transport mechanism 10 described above includes first linear loading route 10*a* and second linear loading route 10*b* parallel to each other on the same side of bonder 8. Loading standby position [B], first operation standby position [C], second operation standby position [E], and unloading position [G] are set on first transport route 10*a*, disposed nearer to bonder 8 than second transport route 10*b*, at an equivalent distance of predetermined pitch p. Substrate-feeding position [A] is set on second transport route 10*b* disposed further from bonder 8 than first transport route 10*a*. First transport route 10*a* and first holder transport mechanism 30 configure a transport mechanism for moving a plurality of substrate holders 20 holding substrate 6 one way from loading standby position [B] to unloading position [G] along the linear transport route.

This transport mechanism transfers substrate holders 20 to loading standby position [B], first operation standby position [C], second operation standby position [E], unloading position [G], substrate-feeding position [A], and then returns the substrate holders 20 to loading standby position [B]. Transport by this transport mechanism makes holder transport mechanism 30 act as a synchronous transport unit for transferring substrate holders 20 respectively set at loading standby position [B], first operation standby position [C], and second operation standby position [E] to first operation standby position [C], second operation standby position [E], and unloading position [G] simultaneously at an uniform pitch.

The above substrate transport system is a workpiece transport device for transferring substrate 6 to first operation position [D] (operation position) by moving substrate holder 20 (workpiece holder) holding substrate 6 (workpiece) along the circulating route. In this workpiece transport device, movable rails 11*b*, 12*b*, 16, and 17, and fixed rail 18 are a plurality of linear guide members that guide movement of substrate holder 20, and coupled rails allow transfer of substrate holder 20 from one rail to another. In addition, rail transfer tables 11*a* and 12*a*, first holder transfer table 14, and second holder transfer table 15 act as a guide member transfer unit forming a circulating route by moving a specific linear guide member out of multiple linear guide members and coupling it to another specific linear guide member.

First holder transport mechanism 30 and second holder transport mechanism 35 are a substrate holder transport unit for moving substrate holder 20 along linear guide members forming the circulating route. Substrate-feeding position [A], loading standby position [B], first operation standby position [C] (workpiece standby position), second operation standby position [E], and unloading position [G] are stops set on this circulating route where substrate holder 20 stops. Substrate 6 transferred from second operation standby position [E] to second operation position [F] is ejected to unloading conveyor 3B together with glass panel 4. Accordingly, from the view of the circulatory transport function of circulatory transport mechanism 10, second operation standby position [E] is an ejection position where substrate 6 is taken outside from the circulating route of circulatory transport mechanism 10.

More specifically, these stops in the workpiece transport device are configured to include substrate-feeding position [A] where substrate 6 is fed to substrate holder 20, first operation standby position [C] where substrate holder 20 stands by before substrate 6 is supplied and moved to first operation position [D] at substrate-feeding position [A], and ejection position [E] where substrate 6 after operation is finished at first operation position [D] is taken outside of the circulating route. Furthermore, first holder transfer table 14 acts as a first transfer unit for transferring substrate holder 20 to first operation standby position [C] and first operation position [D] set at bonding tape applicator 90.

In other words, the circulating route in the workpiece transfer device is configured to include linear first transport route 10a including first operation standby position [C] and second operation standby position [E] as the ejection position, and second transport route 10*b* parallel to this first transport route 10*a*. Rail transfer tables 11*a* and 12*a* which configure the guide member transfer unit couple first transport route 10*a* and second transport route 10*b* by moving movable rails 11*b* and 12*b* which are linear guide members between both ends of first transport route 10*a* and between both ends of second transport route 10*b*.

Substrate holder 20 on which substrate 6 is placed by circulatory transport mechanism 10 stops at positions at least substrate-feeding position [A], first operation standby position [C] before being transferred to first operation position [D], and ejection position [E] where substrate 6 after operation is finished at first operation position [D] is taken outside of the circulating route.

Next, a position stopper for substrate holder 20 provided at each position in the aforementioned substrate transport system is described. This position stopper retains substrate holder 20 sliding on each guide rail by slider 22 shown in FIG. 4 at a correct position.

Figure 8A:
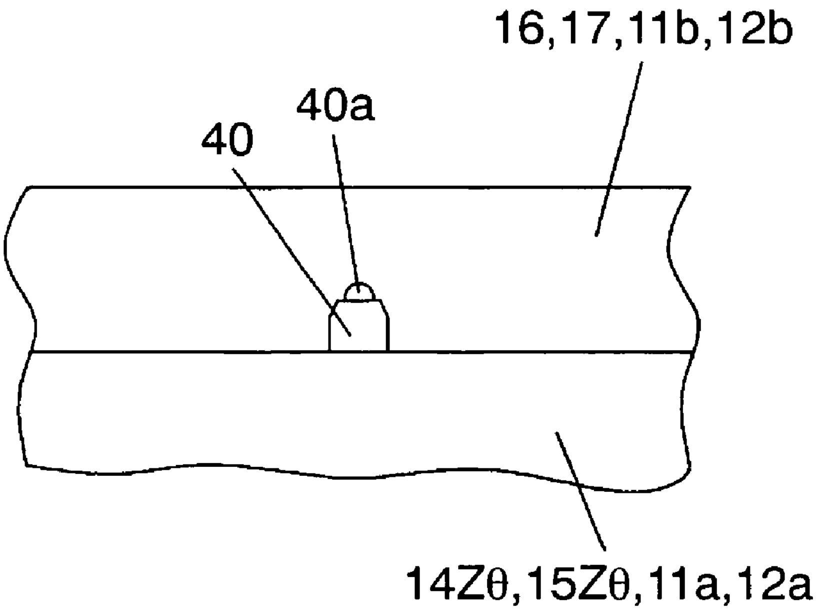
FIGS. 8A and 8B illustrate the structure of a positioning unit of the display panel assembly apparatus in accordance with the preferred embodiment of the present invention.
Figure 8B:
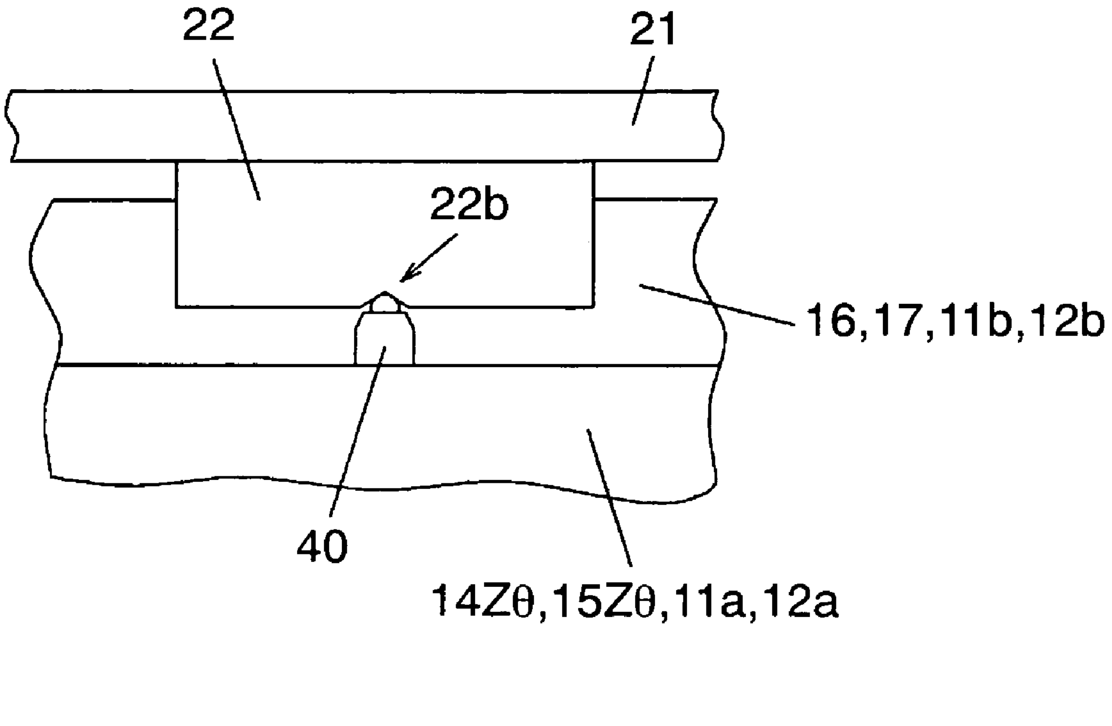

FIGS. 8A and 8B illustrate the structure of the position stopper in the display panel assembly apparatus in the preferred embodiment of the present invention. As shown in FIG. 8A, position stopper 40 with a ball plunger is provided to Zθ-axis tables 14 Zθ and 15 Zθ, and rail transfer tables 11*a* and 12*a*.

As shown in FIG. 8B, attachment table 21 to which substrate holder 20 is fixed moves along movable rail 16, movable rail 17, movable rail 11*b*, and movable rail 12*b* together with slider 22, and reaches a position where position stopper 40 is provided. Then, ball 40*a* given upward force by spring (not illustrated) of position stopper 40 fits into positioning depression 22*b* provided on slider 22, and thus substrate holder 20 is fixed at a predetermined position. Position stopper 40 provided at each position and positioning depression 22*b* provided on each slider 22 configure a positioning unit for fixing substrate holder 20 at each stop position.

Figure 9A:
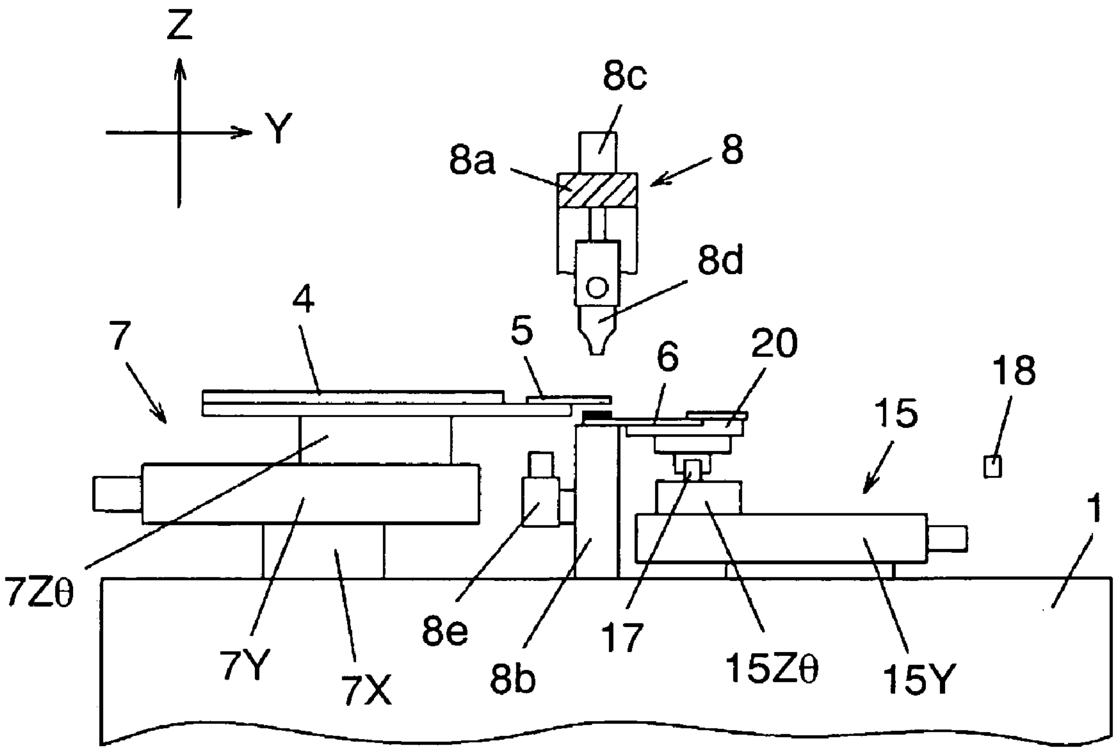
FIGS. 9A and 9B are fragmentary sectional views of the display panel assembly apparatus in accordance with the preferred embodiment of the present invention.
Figure 9B:
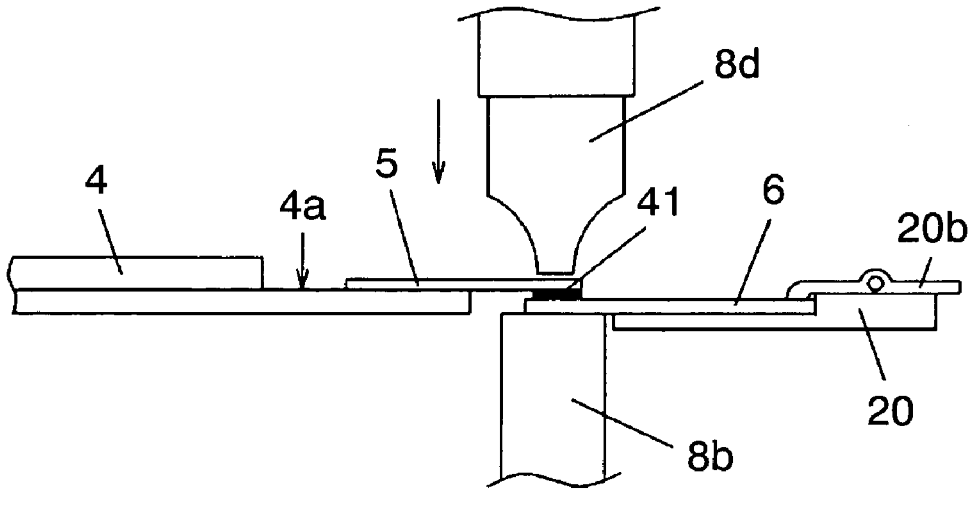

FIGS. 9A and 9B are fragmentary sectional views of the display panel assembly apparatus in the preferred embodiment of the present invention. FIG. 9A is a sectional view taken along 9-9 in FIG. 1, and it shows bonding of glass panel 4 and substrate 6 by bonder 8. Glass panel 4 loaded by loading conveyor 3A is held with a panel holder provided on Zθ-axis table 7 Zθ of panel positioning table 7, and then is positioned with respect to bonder 8 by driving each table mechanism of panel positioning table 7. Here, panel recognition camera 8*e* provided on bonder 8 detects the position of glass panel 4, and glass panel 4 is positioned based on this detection result.

Substrate holder 20 transferred along the circulating route of circulatory transport mechanism 10 holds substrate 6 to which bonding tape 41 is applied by bonding tape applicator 90, and stops at second operation standby position [E]. Then, Y-axis table 15Y transfers substrate holder 20 to second operation position [F]. Second holder transfer table 15 is the second transfer unit which transfers substrate holder 20 holding substrate 6 to second operation standby position [E] and second operation position [F] set at bonder 8.

For bonding, substrate 6 is positioned to a predetermined pressing position on back support 8*b* by driving each table mechanism of second holder transfer table 15. Then, panel positioning table 7 positions glass panel 4 with respect to substrate 6. This enables relative positioning of connecting terminals of connectors 5 prebonded on edge 4*a* of glass panel 4 and connecting terminals of substrate 6.

As shown in FIG. 9B, each of connectors 5 is pressed against substrate 6 via bonding tape 41 by lowering pressing tool 8*d*, and bonding tape 41 is also heated by a heater built in pressing tool 8*d*. This achieves press-bonding of connectors 5 and substrate 6, and completes the display panel assembly. Panel positioning table 7 returns glass panel 4 back to the transport route after pressing tool 8*d* elevates and damper 20*b* of substrate holder 20 clamping substrate 6 is released. Assembled glass panel 4 is finally unloaded to the downstream process by unloading conveyor 3B.

In the above configuration, bonder 8 is a bonding unit which bonds connectors 5 attached to glass panel 4 in advance and substrate 6 via bonding tape 41. In other words, bonder 8 is the bonding unit which bonds substrate 6 (first workpiece) positioned at second operation position [F] and glass panel 4 with connectors 5 (second workpiece) via bonding tape 41 (bonding material).

Panel positioning table 7 disposed in front (one side) of bonder 8 acts as a workpiece positioning unit for positioning glass panel 4 with respect to substrate 6 on substrate holder 20 positioned at second operation position [F], and holding glass panel 4 in which connectors 5 are bonded to its edge 4*a*.

Circulatory transport mechanism 10 and second holder transfer table 15 disposed at back side (the other side) of bonder 8 act as a substrate transfer unit for transferring substrate 6 supplied to substrate holder 20 by substrate-feeding mechanism 13 at substrate-feeding position [A] set in the circulating route to bonder 8 by circulating substrate holder 20 holding substrate 6 along the circulating route.

Bonding tape applicator 90 is disposed on the circulating route and acts as a bonding material feeder which feeds bonding tape 41 to substrate 6 held by substrate holder 20 at first operation position [D]. Still more, first holder transfer table 14 acts as the first transfer unit for transferring substrate holder 20 holding substrate 6 to first operation standby position [C] and first operation position [D]. This first transfer unit transfers substrate holder 20 for applying the bonding tape by bonding tape applicator 90.

FIGS. 10A to 10C and 11A to 11C illustrate the operation of substrate transfer in a display panel assembly method in the preferred embodiment of the present invention. A method of assembling workpieces by bonding substrate 6, the first workpiece, and glass panel 4 to which connectors 5 are prebonded, the second workpiece, using the aforementioned display panel assembly apparatus is described next with reference to FIGS. 10 and 11 in sequence of circulatory transfer of substrate holder 20. In parallel with the operation illustrated in FIGS. 10 and 11, loading conveyor 3A loads glass panel 4 in which connectors 5 are prebonded to its edge 4*a* to panel positioning table 7 (panel loading step) and panel positioning table 7 retains and positions glass panel 4 with respect to bonder 8 from one side (panel positioning step).

Figures 10A, 10B, 10C:
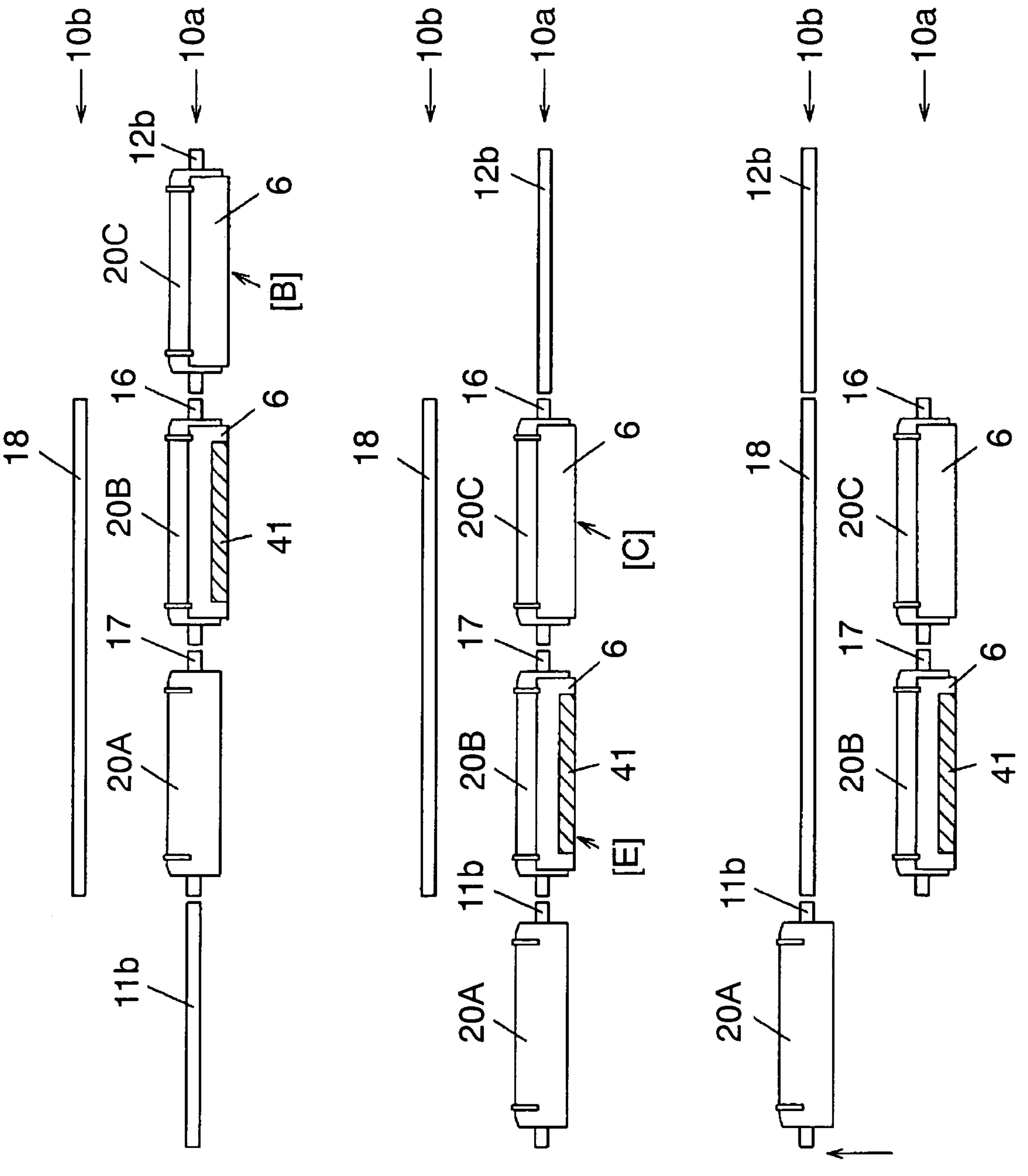
FIGS. 10A, 10B, and 10C illustrate an operation of substrate transfer in a display panel assembly method in accordance with the preferred embodiment of the present invention.

FIG. 10A illustrates the state that substrate holders 20A, 20B, and 20C respectively stops and stands by at movable rails 17, 16, and 12*b* when movable rails 11*b* and 12*b* are coupled to firs transport route 10*a*. Here, letters A, B, and C are added to the reference mark for each of substrate holders 20 for differentiation. In this state, substrate holder 20A is empty without holding substrate 6 because substrate 6 held is bonded to glass panel 4 and is already unloaded together with glass panel 4. Substrate holder 20B holds substrate 6 to which bonding tape 41 is applied by bonding tape applicator 90. Substrate holder 20C holds substrate 6 before bonding tape 41 is applied.

FIG. 10B shows the state that substrate holders 20A, 20B, and 20C are synchronously transferred at once on first transport route 10*a* by first holder transport mechanism 30. Substrate holders 20A, 20B, and 20C are transferred respectively to movable rails 11*b*, 17, and 16.

Next, as shown in FIG. 10C, movable rail 11*b* is coupled to second transport route 10*b*.

As described later in FIG. 11A, substrate holder 20A is transferred to substrate-feeding position [A] on second transport route 10*b*, and substrate-feeding mechanism 13 places substrate 6 onto substrate holder 20A to make substrate holder 20A hold substrate 6.

In parallel with this substrate feeding operation, substrate holder 20B is transferred from second operation standby position [E] to second operation position [F]. Then, bonder 8 bonds substrate 6 and glass panel 4. In addition, substrate holder 20C is transferred from first operation standby position [C] to first operation position [D]. After this transfer, bonding tape applicator 90 applies bonding tape 41 to substrate 6.

Figures 11A, 11B, 11C:
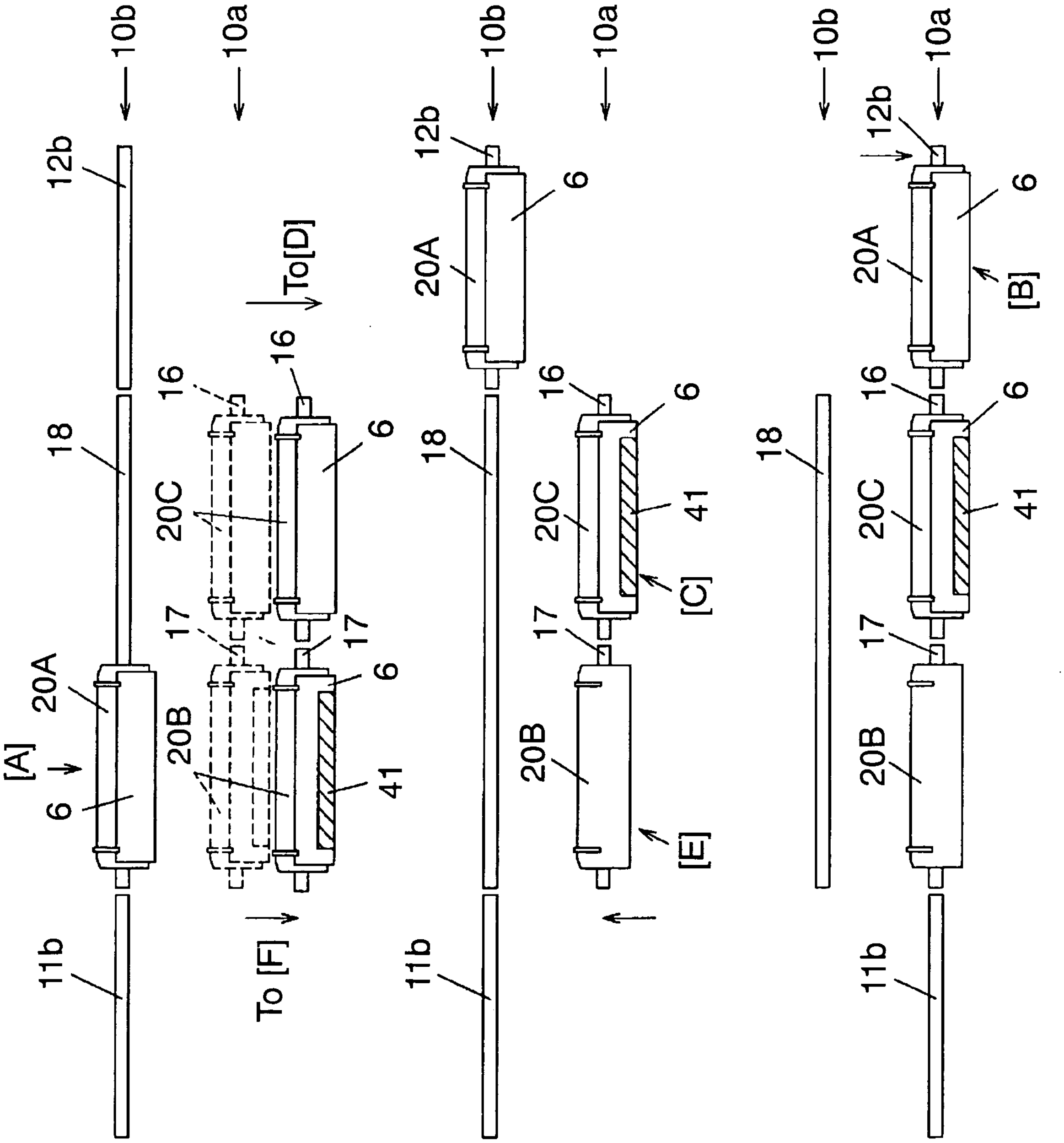
FIGS. 11A, 11B, and 11C illustrate the operation of substrate transfer in the display panel assembly method in accordance with the preferred embodiment of the present invention.

FIG. 11B shows the state that substrate holders 20B and 20C are respectively returned to second operation standby position [E] and first operation standby position [C] after completing the above operations. Substrate 6 held by substrate holder 20B is bonded to glass panel 4, and thus substrate holder 20B is empty. Substrate holder 20C holds substrate 6 to which bonding tape 41 is applied. New substrate 6 is fed to substrate holder 20A, and this substrate holder 20A is transferred to movable rail 12*b* coupled to second transport route 10*b*.

Then, as shown in FIG. 11C, movable rail 12*b* is switched to first transport route 10*a* together with substrate holder 20A, and returns to the state shown in FIG. 10A.

The same operations repeat on and after.

In other words, the operation of the display panel assembly described above includes the substrate transport step for transferring substrate 6 fed to substrate holder 20 by substrate-feeding mechanism 13 at substrate-feeding position [A] to bonder 8 from the other side by circulating substrate holder 20 on which substrate 6 is placed by means of circulatory transport mechanism 10; the bonding material feeding step for applying bonding tape 41 to substrate 6 held by substrate holder 20 by bonding tape applicator 90 disposed on the circulating route of circulatory transport mechanism 10 in the middle of the substrate-feeding step; the bonding step for bonding connectors 5 prebonded to glass panel 4 and substrate 6 using bonding tape 41 by bonder 8; and the panel-unloading step for unloading assembled glass panel 4 from panel-positioning table 7.

The method of bonding and assembling substrate 6 as the first workpiece and glass panel 4 to which connectors 5 are bonded as the second workpiece includes the step of feeding (workpiece feeding step) by placing substrate 6 on substrate holder 20 at substrate-feeding position [A], the first standby step of making substrate holder 20 to which substrate 6 is fed in the feeding step to stand by at first operation standby position [C], the first transfer step of transferring substrate 6 at first operation standby position [C] to first operation position [D]; the bonding material feeding step of feeding bonding tape 41 to substrate 6 on substrate holder 20 at first operation position [D]; second operation standby step of making substrate 6 to which bonding tape 41 is applied to stand by at second operation standby position [E]; the second transfer step of transferring substrate 6 on substrate holder 20 at second operation standby position [E] to second operation position [E]; the workpiece positioning step of positioning glass panel 4 against substrate 6 on substrate holder 20 at second operation position [E]; the bonding step of bonding substrate 6 on substrate holder 20 at second operation position [E] and connectors 5 coupled to glass panel 4 via bonding tape 41; and the unloading standby step of transferring empty substrate holder 20 after substrate 6 is taken out in the bonding step and making substrate holder 20 stand by at unloading position [G].

Circulation of substrate holder 20 by circulatory transport mechanism 10 allows substrate 6 to be transferred to first operation standby position [C] after the feeding step, substrate 6 to be transferred to second operation standby position [E] after the bonding material feeding step, and empty substrate holder 20 to be transferred to substrate-feeding position [A] after the bonding step. Moreover, the substrate holders at, respectively, loading standby position [B], first operation standby position [C], and second operation standby position [E] are simultaneously transferred to first operation standby position [C], second operation standby position [E], and unloading position [G]. Furthermore, during continuous operation, substrate holder 20 reciprocates the circulatory movement to loading standby position [B], first operation standby position [C], second operation standby position [E], unloading position [G], substrate-feeding position [A] and then returns to the loading standby position [B].

Adoption of this substrate transport system establishes the circulating route for circulating substrate holder 20 to take up the smallest feasible space and thus reduces the apparatus's footprint in the system for transporting thin and easy-to-warp substrate 6 by holding it with substrate holder 20. Still more, in the steps of circulating a small number of substrate holders 20, movement of substrate holders 20 becomes more efficient during continuous operation by adopting a structure for synchronously transferring a plurality of substrate holders 20. This improves operation efficiency and productivity.

Figure 12A:
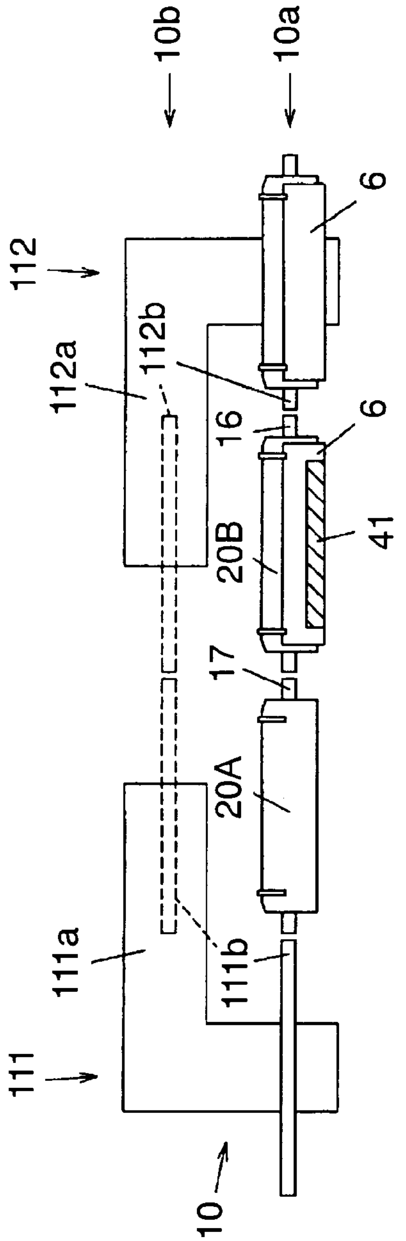
FIGS. 12A, 12B, and 12C illustrate the operation of substrate transfer in the display panel assembly method in accordance with the preferred embodiment of the present invention.

FIGS. 12A to 12C and 13A to 13C illustrate the operation of substrate transfer in the display panel assembly method in the preferred embodiment of the present invention. An example of establishing the circulating route without providing fixed rail 18 is given in the configuration of circulatory transport mechanism 10. As shown in FIG. 12A, circulatory transport mechanism 10 has movable rails 16 and 17 which form first transport route 10*a* in FIGS. 10A to 10C and 11A to 11C. First rail transfer unit 111 and second rail transfer unit 112 are disposed on both ends of first transport route 10*a*. First rail transfer unit 111 and second rail transfer unit 112 are configured to move respectively movable rails 111*b* and 112*b* by rail transfer mechanisms 111*a* and 112*a*.

Rail transfer mechanisms 111*a* and 112*a* are designed to respectively move movable rails 111*b* and 112*b* to positions parallel to movable rails 17 and 16 on second transport route 10*b*, i.e., where fixed rail 18 is disposed in FIGS. 10A to 10C. This configuration allows the formation of second transport route 10*b* without providing fixed rail 18.

FIG. 12A illustrates the state where movable rails 111*b* and 112*b* are coupled to first transport route 10*a*, and substrate holders 20A, 20B, and 20C are stopped and are standing by on movable rails 17, 16, and 112*b*. Each substrate holder 20 is the same as those shown in FIG. 10A.

Figure 12B:
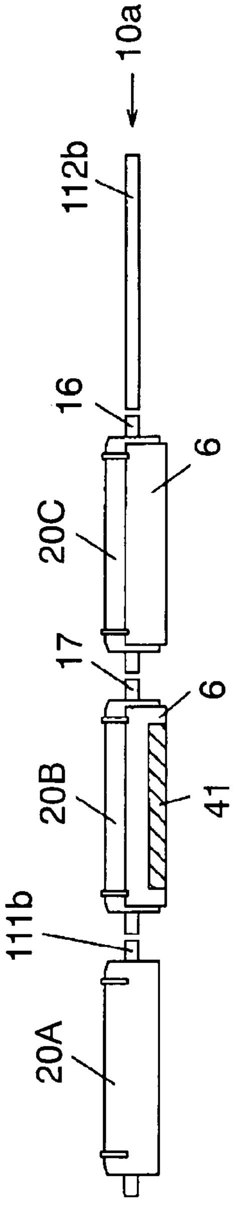
Figure 12C:
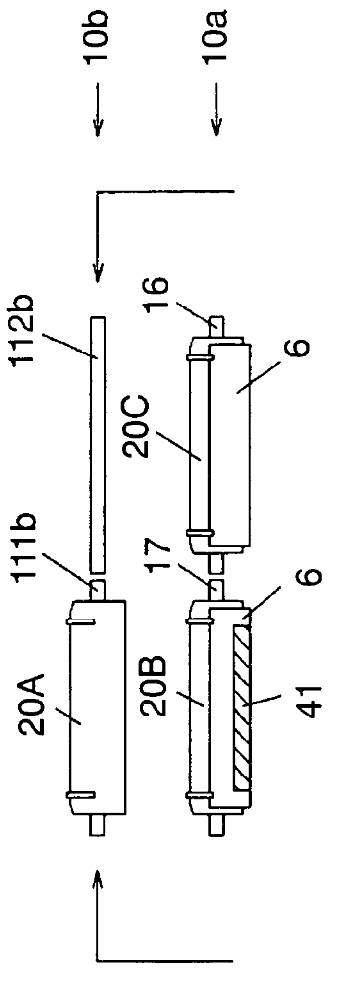
Figure 13A:
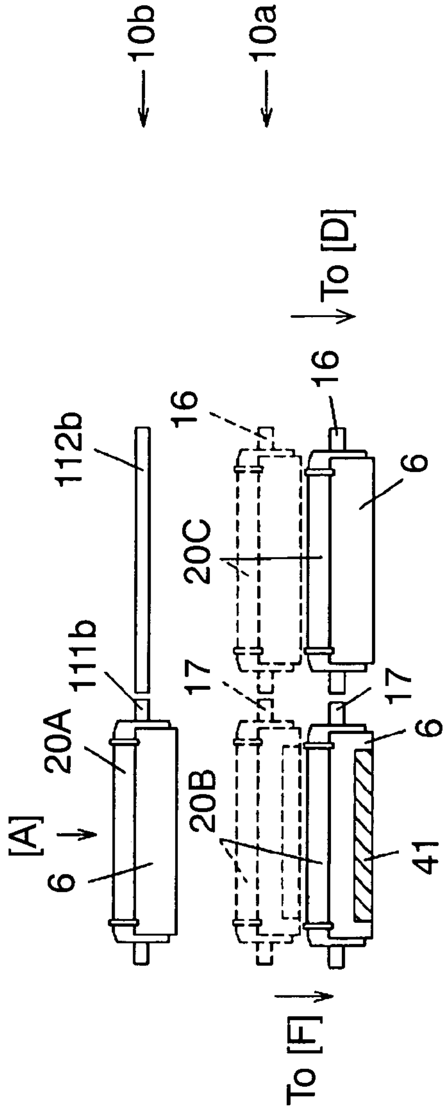
FIGS. 13A, 13B, and 13C illustrate the operation of substrate transfer in the display panel assembly method in accordance with the preferred embodiment of the present invention.

FIG. 12B illustrates the state where substrate holders 20A, 20B, and 20C are transported in the same way as in FIG. 10B, and substrate holders 20A, 20B, and 20C move respectively on movable rails 111*b*, 17, and 16. Then, rail transfer mechanisms 111*a* and 112*a* transfer movable rails 111*b* and 112*b* to second transport route 10*b* to couple movable rails 111*b* and 112*b* as shown in FIG. 12C. This makes substrate holder 20A move to substrate-feeding position [A] together with movable rail 111*b*, at which stage substrate 6 is placed on substrate holder 20A by substrate-feeding mechanism 13. As shown in FIG. 13A, same as in FIG. 11A, bonder 8 and bonding tape applicator 90 operate on substrate holders 20B and 20C.

Figure 13B:
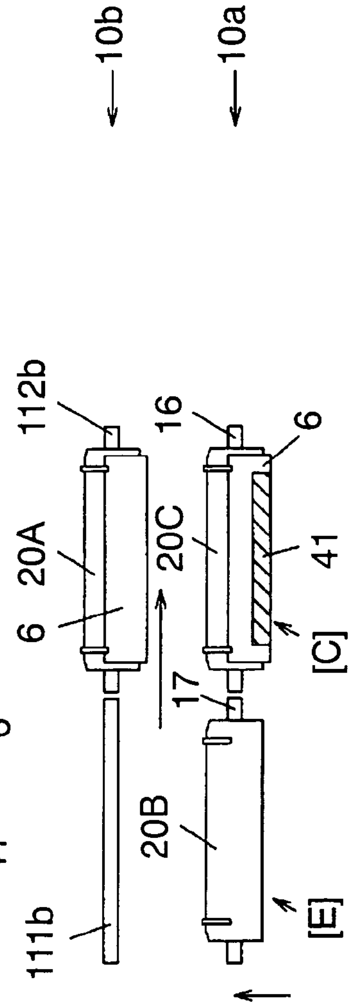

In FIG. 13B, the operation is completed in the same way as in FIG. 11B, and substrate holders 20B and 20C respectively return to second operation standby position [E] and first operation standby position [C]. Here, substrate holder 20A is transferred from movable rail 111*b* to movable rail 112*b* along second transport route 10*b*. Rail transfer mechanisms 111*a* and 112*a* then couple movable rails 111*b* and 112*b* to first transport route 10*a*.

Figure 13C:
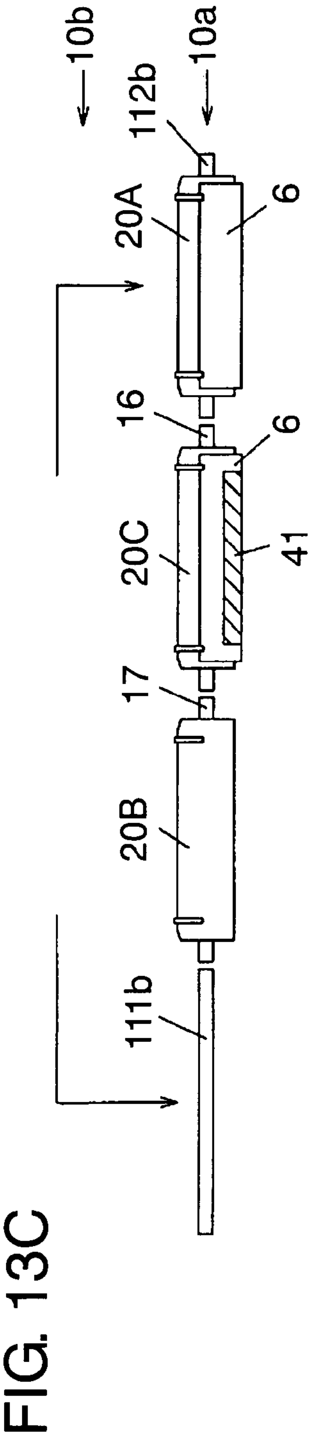

As shown in FIG. 13C, the substrate holders and rails return to the state shown in FIG. 12A. The same operation then repeats.

In the above configuration, rail transfer mechanisms 111*a* and 112*a* form a guide member transfer unit that forms the circulating route by moving and coupling movable rails 111*b* and 112*b*, which are linear guide members, to other specific linear guide members. Adoption of this configuration reduces the length of the apparatus in the transport direction, making an even smaller circulatory transport mechanism feasible.

INDUSTRIAL APPLICABILITY

The display panel assembly apparatus and display panel assembly method of the present invention both reduce the footprint of the apparatus and achieve highly productive assembly of display panels. Accordingly, the present invention is effective in the display panel assembly field, which involves assembly of display panels by bonding a glass panel and driver substrate via connectors.

What is claimed is:

1. A display panel assembly method for assembling a display panel by bonding a substrate onto a glass panel via a bonding material using a bonder, the display panel assembly method comprising:

- a panel loading step for loading the glass panel, on which a connector is bonded to its edge, to a panel-positioning unit;
- a panel positioning step for holding the glass panel and positioning the connector with respect to the bonder from a first side of the bonder by the panel-positioning unit;
- a substrate transport step for transferring the substrate supplied to a substrate holder at a substrate-feeding position to the bonder from a second side of the bonder by circulating the substrate holder on which the substrate is placed using a circulatory transport mechanism, the second side of the bonder being opposite to the first side with respect to the bonder;
- a bonding material feeding step for supplying the bonding material to the substrate held with the substrate holder by a bonding material feeder in a middle of the substrate transport step, the bonding material feeder being disposed on a circulating route of the circulatory transport mechanism;
- a bonding step for bonding the connector onto the substrate via the bonding material by the bonder; and
- a panel unloading step for unloading the assembled display panel from the panel-positioning unit, wherein:
- the circulating route includes a first transport route which is linear and parallel to a panel transport unit and disposed at the second side of the bonder, the first transport route being configured of movable rails, and a second transport route disposed parallel to the first transport route at a position further from the bonder than the first transport route at the second side of the bonder, the second transport route being configured of a fixed rail;
- the substrate holder circulates in the circulating route by being transferred between the first transport route and the second transport route; and
- the bonding material feeding step is executed on the first transport route.

2. The display panel assembly method as defined in claim 1, wherein the substrate transport step comprises:

- stopping and standing by the substrate holder at a first operation standby position and a second operation standby position set on the first transport route;
- transferring the substrate holder holding the substrate from the first operation standby position to the bonding material feeder; and
- transferring the substrate holder holding the substrate from the second operation standby position to the bonder.

3. The display panel assembly method as defined in claim 1, wherein the circulatory transport mechanism includes a transfer part being configured to linearly move between the first transport route and the second transport route.

* * * * *